United States Patent
Jorgenson

(10) Patent No.: US 6,760,974 B1
(45) Date of Patent: Jul. 13, 2004

(54) HEIGHT DETERMINING INSTRUMENT FOR POURED FLOORS, AND METHOD

(75) Inventor: Ronald Jorgenson, Maple Plain, MN (US)

(73) Assignee: Maxxon Corporation, Hamel, MN (US)

(*) Notice: Subject to any disclaimer, the term of this patent is extended or adjusted under 35 U.S.C. 154(b) by 0 days.

(21) Appl. No.: 10/425,254

(22) Filed: Apr. 29, 2003

(51) Int. Cl.[7] .............................................. G01C 15/06
(52) U.S. Cl. ............................ 33/296; 33/228; 33/526
(58) Field of Search .......................... 33/227, 228, 286, 33/293, 296, 518, 526, 833, DIG. 21

(56) References Cited

U.S. PATENT DOCUMENTS

| | | | | |
|---|---|---|---|---|
| 3,117,378 A | * | 1/1964 | Bowen | 33/293 |
| 3,230,626 A | * | 1/1966 | Berrien | 33/293 |
| 3,319,391 A | | 5/1967 | Lutch | 52/371 |
| 3,367,031 A | * | 2/1968 | Ward | 33/296 |
| 3,460,260 A | * | 8/1969 | Sarlandt | 33/293 |
| 3,775,929 A | | 12/1973 | Roodvoets et al. | 33/286 |
| 4,141,310 A | * | 2/1979 | Rich, Jr. | 33/293 |
| 4,574,554 A | | 3/1986 | Gentry | 52/741 |
| 4,891,888 A | | 1/1990 | Maria De Bree et al. | 33/293 |
| 4,899,452 A | * | 2/1990 | Schafer | 33/296 |
| 5,243,398 A | | 9/1993 | Nielsen | 356/138 |
| 5,551,159 A | * | 9/1996 | Mooty | 33/228 |
| 5,566,460 A | * | 10/1996 | Bates | 33/296 |
| 5,943,784 A | * | 8/1999 | Hiramine | 33/293 |
| 6,256,895 B1 | | 7/2001 | Akers | 33/286 |
| 6,508,006 B1 | * | 1/2003 | Black | 33/293 |
| 2002/0174552 A1 | | 11/2002 | Akers | 33/286 |

* cited by examiner

Primary Examiner—G. Bradley Bennett
(74) Attorney, Agent, or Firm—Fredrikson & Byron, P.A.

(57) ABSTRACT

A height indicating instrument useful for preparing flat and level cementitious floors over an uneven sub floor. The instrument includes first and second rod assemblies, the first having a foot engagable with the surface of a sub floor and the second assembly operatively attached to and moveable axially with respect to the first assembly. The second assembly includes a height indicator to indicate the desired underlayment height, and carries a laser beam detector. A laser beam generator generates a horizontal laser beam detectable by the laser beam detector. Vertical movement of the second rod assembly with respect to the first rod assembly to horizontally align the detector with the generator simultaneously moves the height indicator to adjust elevation of the latter with respect to the foot. At a plurality of locations on the uneven sub floor, slurry is poured until the slurry rises into contact with the height indicator at each such location.

18 Claims, 2 Drawing Sheets

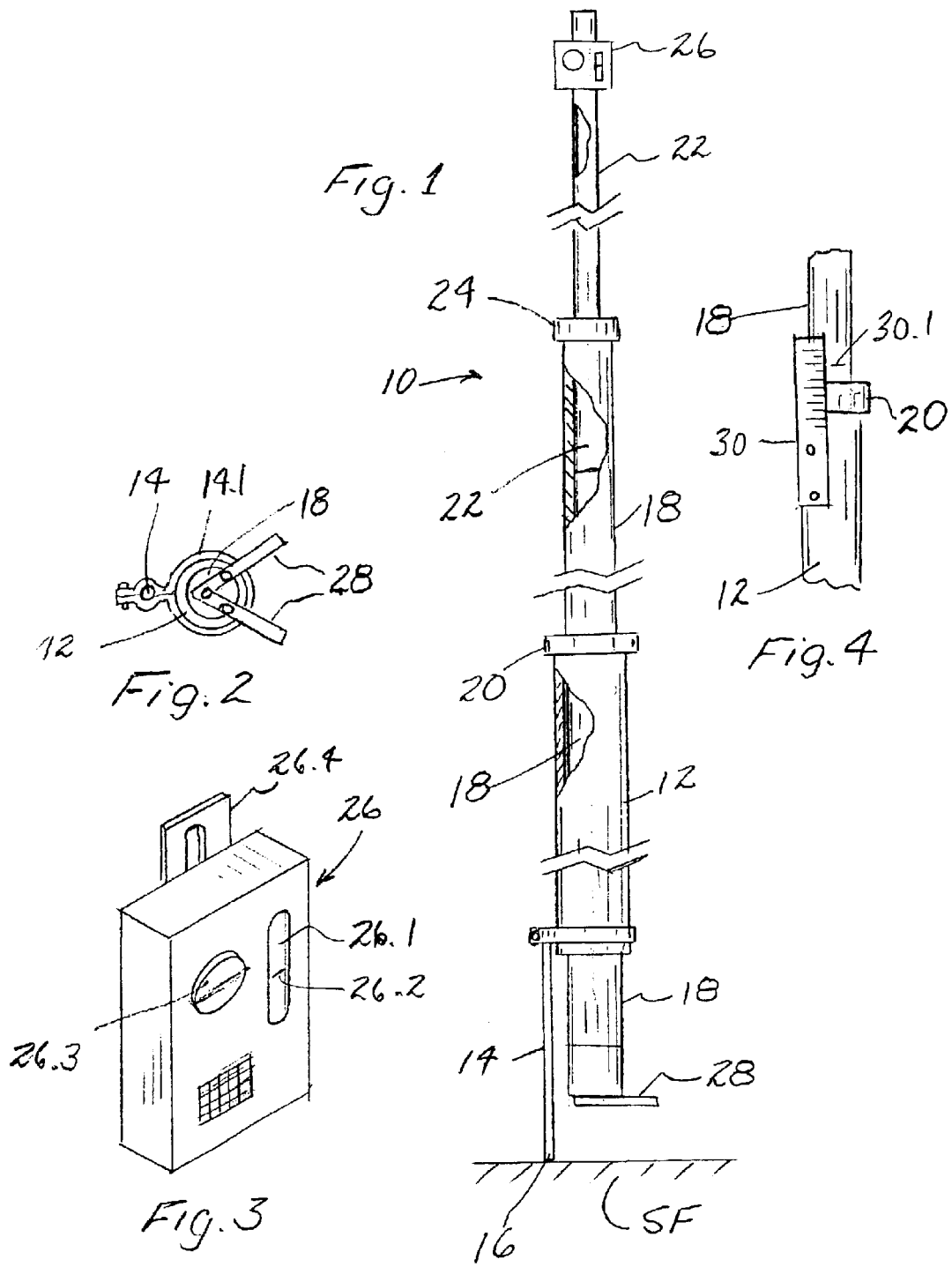

HEIGHT DETERMINING INSTRUMENT FOR POURED FLOORS, AND METHOD

The present invention relates to a height-indicating instrument and method enabling the production of poured cementitious floors upon uneven sub flooring, the poured flooring having a flat, level top surface and a thickness not less than a predetermined minimum thickness.

BACKGROUND OF THE INVENTION

Old apartment buildings, houses and other structures commonly have floors that are uneven, due to a variety of causes. When such buildings are renovated, it is desirable to pour new cementitious flooring over old, uneven sub floors to provide level, horizontal, flat flooring having at least a minimum thickness. Although pourable cementitious slurries generally are self-leveling to some extent, high spots and low spots nonetheless can result if care is not taken to distribute the slurry in such a manner that its top surface is flat and level.

Moreover, it is generally desired to maintain a minimum cementitious flooring thickness, and this may be difficult to accomplish when pouring a slurry upon a floor that is quite uneven and that has high spots and low spots, inasmuch as the poured flooring may be too thin at the high spots of the sub floor. If one can measure the elevation of a sub floor in different spots, and place markers on the floor designating heights all lying in a level, horizontal plane, then the slurry can be worked so that its upper surface coincides with the heights designated by the markers. This, however, requires substantial time-consuming work in determining the exact elevation of different flooring areas so that accurate height markers can be placed.

It would be desirable to provide an instrument and method for enabling a cementitious slurry to be quickly and easily poured on a floor to a predetermined elevation with the slurry at the highest point of the sub floor being at a minimum predetermined thickness.

SUMMARY OF THE INVENTION

In one embodiment, the invention relates to a height indicating instrument that comprises a first rod assembly that has a foot engagable with the surface of a sub floor and a second rod assembly that is operatively attached to and moveable axially with respect to the first assembly. The second rod assembly includes a height indicator to indicate the desired underlayment height above a sub floor, and carries a laser beam detector. A laser beam generator is provided to generate a horizontal laser beam detectable by the laser beam detector. Vertical movement of the second rod assembly with respect to the first rod assembly to horizontally align the laser detector with the laser generator simultaneously moves the height indicator to adjust the elevation of the latter with respect to the sub floor.

In a preferred embodiment, the height indicating instrument as thus described employs inner and outer tubes in respective sliding, telescoping engagement, and a lock is provided for releasably locking the inner and outer tubes against relative axial movement. The instrument desirably is devoid of structure, other than the foot, that extends downwardly beyond the height indicator, that is, below the elevation of the height indicator.

The invention, in another embodiment, provides a method for pouring a cementitious slurry to a desired elevation in a given sub floor area, e.g., a room, while ensuring that the slurry at the perceived or approximate point of highest elevation of the sub floor will be not have less than a predetermined thickness. The method comprises providing a first rod assembly having a lower foot that is engageable with the surface of the sub floor, and a second rod assembly operatively attached to and moveable axially with respect to the first rod assembly. The second rod assembly has a height indicator to indicate the desired underlayment height, and carries a laser beam detector. The foot of the first rod assembly is placed upon the sub floor at a first location which is a point of high elevation, desirably the point of highest elevation, of the sub floor, and the height indicator is adjusted to a given elevation which will be the elevation of the entire poured floor, the height indicator being spaced a predetermined distance above the sub floor, this distance being not less than the desired minimum thickness of the cementitious floor underlayment. While maintaining that predetermined distance, the laser beam detector is adjusted to detect a horizontal laser beam emitted from a laser beam generator. As the cementitious slurry is poured, the foot of the device is moved from one position to another over the sub floor area. At each position, while maintaining constant the separation between the height indicator and the laser beam detector, the detector is adjusted to detect the horizontal laser beam, thereby adjusting the height indicator upwardly or downwardly to the given elevation. Once the slurry at that point has reached the predetermined elevation, the device is moved to another point on the sub floor, and the process is repeated as many times as needed to provide a level floor.

If desired, a height marker may be applied to the sub floor at the first location to indicate the height of the height indicator at that location, and another marker is applied to the sub floor at other locations to indicate the height of the height indicator at that location. By repeating the process several times, a series of markers is applied to the floor at locations spaced from one another, with the height indicated by the markers defining a horizontal, flat plane to which the upper surface of a cementitious slurry should reach, the resulting flooring having a minimum thickness at the first location.

IN THE DRAWING

FIG. 1 is a broken-away illustration, in partial cross section, showing a height indicating instrument of the invention;

FIG. 2 is a bottom illustration of the instrument shown in FIG. 1;

FIG. 3 is a largely schematic illustration of a laser beam detector of commercial design and which can be employed with the instrument of the invention;

FIG. 4 is a broken-away illustration of a portion of the instrument of FIG. 1, showing the use of a ruler.

DESCRIPTION OF THE PREFERRED EMBODIMENTS

Figure 5:
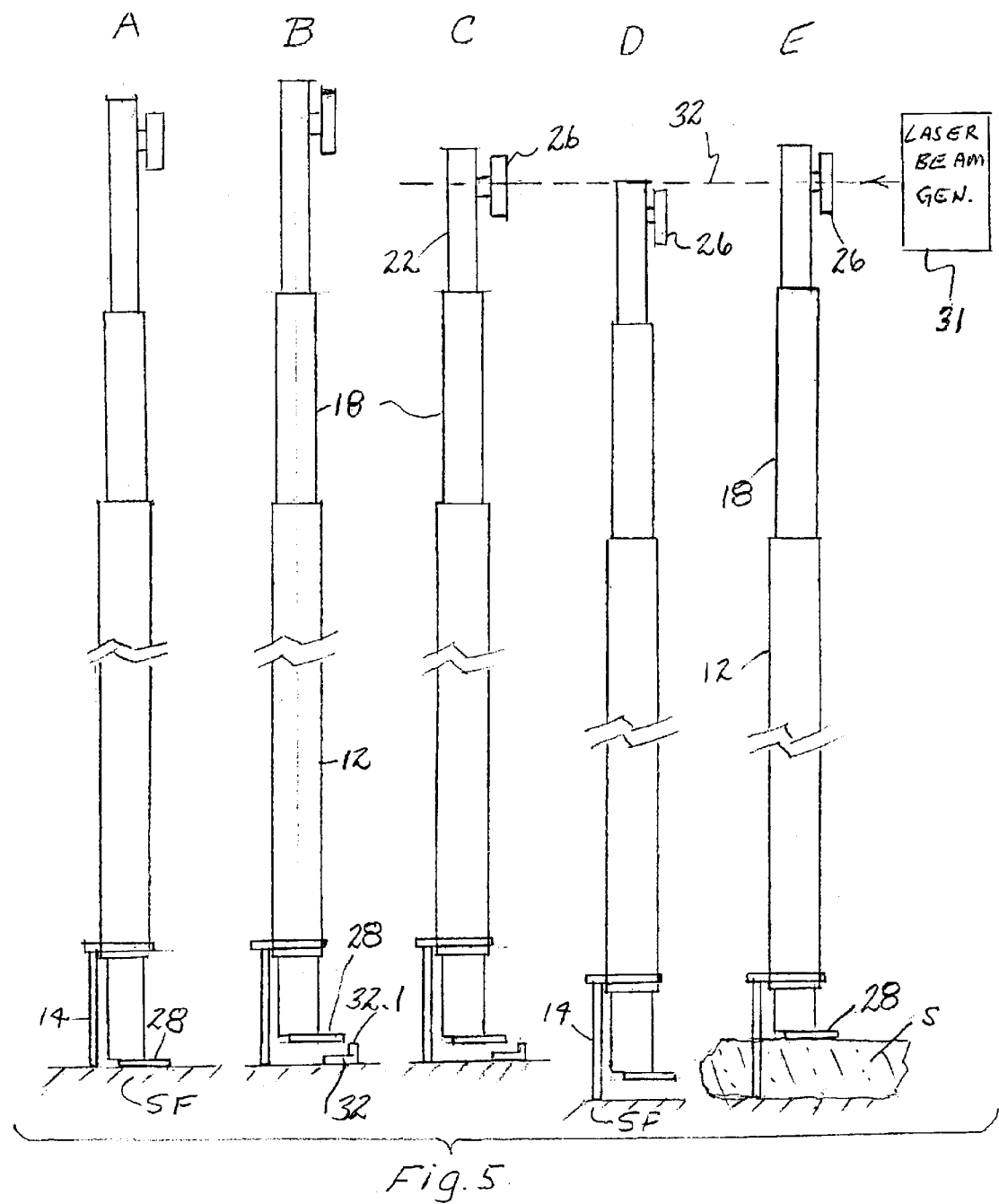
FIG. 5 is a series of five illustrations of the instrument of FIG. 1, shown schematically, the illustrations representing consecutive steps in one method of the invention.

It should be understood at the outset that the instrument of the present invention may take a variety of different forms, and that the preferred embodiment described hereafter represents only one of many embodiments of the invention.

The term "elevation", as used herein, means the height above sea level. All points in a horizontal plane, accordingly, have the same elevation. "Sub floor" refers to any floor over which a level cementitious slurry is to be poured.

With reference to FIG. 1, an instrument of the invention 10 is exemplified as comprising three concentric tubes that are telescopically slidable with respect to each other. These tubes are of a size easily carried and handled by an individual, and desirably are in the range of about 1 inch to about 1.5 inches in diameter, although larger and smaller tubes can be employed as desired. An outer tube 12, forming a first rod assembly, carries at its lower end a foot 14, the foot having a lower end surface 16 engagable with the sub floor SF of a building. The foot, and particularly its lower end, desirably are smooth so that they can easily be cleaned of slurry after use.

Telescopically received within the outer tube 12 is a middle tube 18, the middle tube protruding from both the top and bottom ends of the outer tube 12. A lock is provided to releasably lock the middle and outer tubes against axial movement, the lock being depicted at 20 as being a twist lock of the type commonly found on extension poles commonly employed for changing light bulbs, washing windows, and the like.

An inner tube is shown at 22, and is slidingly received within the upper open end of the middle tube 18, the inner tube and middle tube being joined by a releasable lock 24 which may be of the same type as the twist lock shown at 20. Mounted adjacent the upper end of the inner tube 22 is a laser beam receiver 26, and mounted at the lower end of the middle tube 18 is a height indicator 28.

From FIG. 1, it will be noted that if the lock 24 is in its locked position and the lock 20 is in its unlocked position, the inner and middle tubes can move as a unit, as a second rod assembly, through the outer tube 12, with the vertical distance between the laser detector 26 and the height indicator 28 remaining unchanged. Loosening the lock 24 permits the tube 22 to move axially within the middle tube 28 so that the height of the laser detector 26 can be adjusted with respect to the middle tube 18 and thus with respect to the height indicator 28. The inner tube serves as a convenient support for the laser detector and is readily movable axially of the middle tube. Of course, the laser detector could easily be adjustably mounted to the middle tube using a mount enabling the detector to be adjusted axially of the middle tube.

The laser beam detector 26, and the laser beam generator 30 shown in FIG. 5, are commercial units that can be employed, for example, in surveying. Laser generators that provide a rotating, horizontal laser beam, and suitable laser beam detectors, are available, for example, as the Berger Instruments LaserMark® devices and under the DeWalt® trademark. Laser beam generators that produce rotating horizontal laser beams (that is, laser beams that rotate about the vertical axis of the device and that sweep out a horizontal plane) can be mounted on a suitable tripod at a convenient working level, e.g., about 4 feet above the surface of the sub floor, and generate a narrow laser beam. Laser beam detectors of the type depicted at 26 in FIG. 3 commonly have a window 26.1 having a central point 26.2, and may be equipped with a light or speaker that flashes a light or generates a tone when a laser beam is detected at the point 26.2. These units commonly are battery operated, and may have several controls including a function control knob 26.3. The detector 26 shown in FIG. 3 may be provided with a back bracket 26.4 to facilitate attachment to the inner tube 22 or, using a crank adjustment mechanism, from either the inner or middle tubes.

FIG. 2 shows a bottom illustration of the instrument of FIG. 1, and depicts a pair of straps 28 that are attached to the bottom of the tube 18 as height indicators and that extend horizontally outwardly as shown. One or more straps, i.e., horizontally elongated members, are particularly desired in that is easy to determine visually when the height of a slurry has risen to the level of the straps. FIG. 2 also shows a circular clamp 14.1 that encircles the lower end of the tube 12, the band having arms projecting away from the tube 12 and encircling a rod functioning as the foot 14. Note particularly that the device at its lower end is desirably free of structure other than the foot 14 beneath the elevation of the height indicator so that as the device is moved from one position to another as slurry is being poured, the foot and the height indicator are the only structures contacted by the slurry.

As will be described further below, the middle tube 18 may be axially adjusted within the outer tube 12 when the lock 20 is loosened, and to conveniently measure the axial distance that the tube 18 is moved with respect to tube 12, a ruler 30 may be mounted as shown in FIG. 4 to the outer tube 12, the ruler being used in association with a scribe line 30.1 formed on the middle tube 18, as shown.

Operation of the instrument shown is depicted in FIG. 5, with illustrations A through E showing certain stages in the operation of this particular instrument. For ease of understanding, the instruments in FIG. 5 are shown largely in schematic form. It will be understood here that a laser generator 31 has been placed in a convenient location spaced above the sub floor and supported, e.g., by a tripod, and positioned on or near the sub floor area (e.g., a room or other convenient area) upon which a cementitious flooring is to be poured, the laser generator generating a horizontal beam shown in FIG. 5 as 32.

One may begin by placing the instrument of the invention upright upon a sub floor with the bottom of the foot 14 resting on the sub floor and the height indicator 28 also resting on the sub floor. It should be understood that the initial location on the sub floor for placement of the instrument should be the location that is perceived to be the highest point on the sub floor, that is, the point of greatest elevation. This can often be determined by simply viewing the sub floor from a position close to the sub floor level, or through the use of a carpenter's level, horizontal string, etc. The lock 20 is loosened, and the middle tube 18 is raised within the outer tube 12 until the bottom of the height indicator 28 is spaced the desired distance above the sub floor, this distance being the desired minimum thickness of the resulting cementitious floor.

In the preferred method of the invention; the device is moved from place to place on the sub floor concurrently with the pouring of the cementitious slurry, and as soon as the slurry has reached the desired elevation at one position, the device is moved to another position. That is, the steps of locating the desired given elevation at different locations on the sub floor and pouring of the cementitious slurry are carried out simultaneously. In a less preferred embodiment, the method is carried out in sequential steps, the first step involving the placement of height markers at different positions on the sub floor, and the second step involving pouring of the slurry to the elevation shown by the markers.

One embodiment of a marker is shown at 32, the marker being configured and positioned to display the height of the bottom of the height indicator 28. The marker 32, can take any desired form, and may be a length of aluminum tape having a pressure-sensitive adhesive on one side, the tape being bent so that its upper end 32.1 is at the desired height. Of course, the marker 32 may extend upwardly beyond the height indicator 28, with a mark simply made on the marker 32 to indicate the height of the height indicator. Markers also may take the form of nails or other rods that can be driven into or otherwise attached to sub flooring, or other objects of predetermined height laid on or attached to the sub floor.

Moving to illustration C in FIG. 5, the lock 24 (FIG. 1) has been loosened and the inner tube 22 has been adjusted axially so that the laser beam is detected by the detector 26, following which the lock 24 is again tightened. During this step, the foot 14 remains upon the sub floor and the height indicator 28 remains spaced above the sub floor by the distance that was set as described above in connection with illustration B. The distance by which the middle tube 18 is thus raised with respect to the outer tube 12 may be readily visualized using the rule 30 shown in FIG. 4. Here, the tube 18 is raised until the scribe mark 30.1 moves the desired distance along the rule 30.

The instrument of the invention then may be moved to another area of the sub floor that is at a lower elevation. This is depicted in illustration D of FIG. 5, showing the foot 14 again in contact with the sub floor and the height indicator spaced from the sub floor by the same distance as was set in connection with illustration B. Because the whole instrument is now at a slightly lower elevation, the laser detector 26 is below the level of the laser beam 32. Lock 20 now is loosened, and while the outer tube 12 is maintained stationary, the middle tube 18 is raised until the laser beam is again detected. Raising of the middle tube 18 in this manner also raises the height indicator 28 as illustrated in illustration E. The cementitious slurry "S" that is being poured is allowed to rise to the level of the height indicator as shown in Illustration E of FIG. 5. The device is then moved to other locations on the sub floor and the procedure is repeated at each location. At each location, then, the height indicator is adjusted to the given elevation, and the surface of the resulting poured floor is quite level; that is, it lies in a single horizontal plane at the desired elevation.

If height markers are used, the procedure thus described with respect to illustrations D and E are repeated as necessary over other locations on the sub flooring before the cementitious slurry is poured, with a height marker being positioned at each location to indicate the given elevation. This, in turn, provides a series of markers 32 having their upper ends lying in a flat, level, horizontal plane. When a cementitious slurry is poured on the floor, it can thus be worked or otherwise controlled so that its height matches the upper ends 32.1 of the various markers. This procedure, however, takes longer than the preferred procedure and may give rise to inaccuracies inasmuch as the markers may be accidentally moved or bent as workers walk on the prepared sub floor.

It should now be understood that a variety of other constructions can be used to afford the same result as that described above. For example, as a first rod assembly, an elongated solid rod may be employed, the bottom surface of which serves as the foot 14, and another bar or rod may be attached to it as a second rod assembly in a fashion permitting the rods to slide axially with respect to each other. The bottom of the second mentioned rod may serve as the height indicator 28, and a laser beam detector may be attached to the upper end of the second rod in a manner that permits the laser detector to be adjusted upwardly or downwardly on the second rod. With respect to the tube or rod versions thus described, the laser detector may be attached utilizing a crank mechanism similar to that employed with camera tripods in which rotation of the crank will move the laser beam detector upwardly or downwardly with respect to the rod or tube that carries it. In this manner, instead of adjusting the tube 22 upwardly or downwardly with respect to the tube 18 as shown in FIG. 5, one may instead merely adjust the height of the laser detector 26 on the tube 22. In similar fashion, a crank may be employed to operate a gear mechanism for the purpose of adjusting the axial position of the middle tube 18 with respect to the outer tube 12. The mechanism again may be of the type employed with photographic tripods and the like, is well known, and needs no further description. Inasmuch as different locations on a sub floor commonly vary in elevation only by a small amount, the laser beam detector need be moved only a short distance upwardly or downwardly to bring it into alignment with the laser beam, and this can be accomplished in a matter of seconds by experienced workmen.

Moreover, with respect to illustrations A and B of FIG. 5, the foot 14, which here takes the configuration of a downwardly extending rod having a bottom surface 16, may be axially moveable with respect to the outer tube 12 so that (illustration B) instead of raising the middle tube to provide the desired gap between the height indicator and the sub floor, one may merely adjust downwardly the foot 14 on the tube 12 to accomplish the same result.

Thus, there is provided a height indicating instrument that can quickly and easily be used to place markers on a sub floor and that will result in the production of a flooring having a flat, level upper surface with a minimum desired thickness. In use, the instrument of the invention may be operated by one person as the instrument is moved from location to location on the sub floor. If used with height markers, the markers may be placed on the floor by another person. As the instrument is moved from location to location on the sub floor, a plurality of markers is thus attached to the sub floor. The markers can be thus applied quickly and accurately in a fraction of the time previously required for performing this job.

While a preferred embodiment of the present invention has been described, it should be understood that various changes, adaptations and modifications may be made thereto without departing from the spirit of the invention and the scope of the appended claims.

What is claimed is:

1. A height indicating instrument useful in the preparation of a flat and level cementitious floor underlayment over an uneven sub floor, comprising a first rod assembly having a foot engagable with the surface of a sub floor, and a second rod assembly operatively attached to and adjustable axially with respect to the first assembly, the second rod assembly having a height indicator adjacent said foot to indicate the desired underlayment height and carrying a laser beam detector adjustable vertically with respect to said height indicator, the instrument including a laser beam generator for generating a horizontal laser beam detectable by said laser beam detector, whereupon vertical movement of said second rod assembly with respect to the first rod assembly to horizontally align said detector with said generator simultaneously moves said height indicator to adjust the elevation of the latter with respect to the sub floor.

2. The instrument of claim 1 including a mount mounting said laser detector to said second rod assembly and enabling adjustment of said detector with respect to said second rod assembly to horizontally align said detector with said generator without simultaneously moving said height indicator with respect to said foot.

3. The instrument of claim 1 including a rule attached to said instrument and positioned to measure the length of axial movement between said rod assemblies.

4. The instrument of claim 1 wherein said rod assemblies comprise inner and outer tubes in respective sliding, telescoping engagement and including locks releasably locking the inner and outer tubes against relative axial movement.

5. The instrument of claim 4 wherein said second rod assembly includes first and second tubes in sliding, telescoping engagement and including locks releasably locking the first and second tubes against relative axial movement.

6. The instrument of claim 5 wherein said first tube is received within said inner tube, and wherein said laser detector is mounted to said second tube to enable axial adjustment thereof with respect to said second rod assembly.

7. The instrument of claim 1 wherein said foot comprises an axially extending elongated rod mounted to said first rod assembly and terminating in a floor engaging surface.

8. The instrument of claim 7 including a mount slidably and adjustably mounting said elongated rod to said first rod assembly.

9. The instrument of claim 5 including a rule mounted to said outer tube and positioned to measure the length of axial movement between said outer tube and said inner tube.

10. The instrument of claim 1 wherein said instrument is devoid of structure, other than said foot, below the elevation of the height indicator.

11. The instrument of claim 1 wherein the height indicator includes a horizontally elongated member.

12. The instrument of claim 11 wherein said member is a strap.

13. Method of preparing a flat and level cementitious floor underlayment over an uneven sub floor area, comprising:

a. choosing a location in the floor area having the greatest apparent elevation;

b. providing a device having a first rod assembly having a lower foot having a surface engagable with the surface of the sub floor, and a second rod assembly operatively attached to and movable axially with respect to the first rod assembly, the second rod assembly having a height indicator to indicate the desired underlayment height and carrying a laser beam detector, c. adjusting the height indicator a predetermined distance above the foot surface, and, with the foot surface in contact with the sub floor at said location and the height indicator spaced above said surface at a given elevation, adjusting the laser beam detector into alignment with and to detect a horizontal laser beam emitted from a laser beam generator, and d. placing the foot surface upon the sub floor at a second location of lower elevation than the first location, and while maintaining constant the separation between the height indicator and the laser beam detector, adjusting the detector to detect said laser beam, thereby adjusting said height indicator to said given elevation.

14. The method of claim 13 including the step of concurrently pouring a cementitious slurry on the sub floor, permitting the slurry to rise to the level of the height indicator, and then moving the device to a different location on the sub floor, adjusting the detector to detect said laser beam to thereby adjusting said height indicator to said given elevation, and permitting the slurry to rise to the level of the height indicator at said different location.

15. The method of claim 13 including applying to the sub floor at said first and second locations height markers marking the height of the height indicators at those locations.

16. The method of claim 15 including applying to the sub floor at a plurality of locations in addition to said first and second location height markers marking the height of the height indicators at those locations to provide a plurality of height markers marking heights lying in a single horizontal plane at said given elevation.

17. The method of claim 13 wherein said second rod assembly includes at least upper and lower telescoping rods, the lower telescoping rod carrying said height indicator and said upper rod carrying said laser beam detector, a first adjustment for adjusting the height of the height indicator above the sub floor, and a second adjustment for adjusting the vertical position of the laser beam generator with respect to the height indicator, the method including adjusting the first adjustment to space the height indicator above the foot surface by the minimum desired thickness of the floor underlayment and thereafter adjusting the second adjustment to align to align the laser detector with the laser beam emitted from the laser generator.

18. The method of claim 14 wherein said lower foot includes a generally horizontal strap, and wherein said slurry is permitted to rise at each location until the slurry contacts the strap.

* * * * *